United States Patent [19]

Simms

[11] Patent Number: 5,339,940

[45] Date of Patent: Aug. 23, 1994

[54] EQUIPMENT ALIGNMENT DOCKING SYSTEM

[75] Inventor: Alan Simms, Guildford, Great Britain

[73] Assignee: LSI Logic Corporation, Milpitas, Calif.

[21] Appl. No.: 17,097

[22] Filed: Feb. 12, 1993

[30] Foreign Application Priority Data

Feb. 14, 1992 [GB] United Kingdom ............ 9203211.9

[51] Int. Cl.$^5$ ............................................. B65G 47/00
[52] U.S. Cl. .................... 198/345.3; 403/11; 269/900
[58] Field of Search ............ 414/401; 198/346.1, 198/345.3; 269/900; 403/11, 13, 14

[56] References Cited

U.S. PATENT DOCUMENTS

| | | | |
|---|---|---|---|
| 3,007,253 | 11/1961 | Smeets | 33/189 |
| 3,183,777 | 5/1965 | Damm | 414/401 X |
| 3,548,209 | 12/1970 | Smith | 250/106 |
| 4,049,500 | 9/1977 | Kamm | 198/345.3 |
| 4,127,856 | 11/1978 | Bickel | 414/401 X |
| 4,131,295 | 12/1978 | Highberger | 280/475 |
| 4,201,284 | 5/1980 | Brems | 198/345.3 |
| 4,368,899 | 1/1983 | Smalley et al. | 280/477 |
| 4,586,702 | 5/1986 | Chambers | 198/345.3 X |
| 4,629,053 | 12/1986 | Dailey | 198/346.1 |
| 4,706,796 | 11/1987 | Chambers | 198/346.1 |
| 4,799,586 | 1/1989 | Kutzli et al. | 198/345.3 X |
| 4,919,586 | 4/1990 | Derby | 414/735 |
| 5,111,593 | 5/1992 | Gehen, Sr. | 33/613 |

*Primary Examiner*—Frank E. Werner
*Assistant Examiner*—James Eller
*Attorney, Agent, or Firm*—Gerald E. Linden

[57] ABSTRACT

A piece of movable equipment is provided with a male docking bar (10). An immovable piece of equipment is mounted to an immovable fixture which has a female docking bar (28). The female docking bar (28) has freedom to move in a first axis. The movable piece of equipment is brought into contact along a second, orthogonal axis to meet the immovable piece of equipment, at which point lugs (12) on the male docking bar mate with corresponding holes (30) on the female docking bar. The male locking bar can then be interlocked (16, 32) to the female docking bar. The movable piece of equipment can then further be moved along the first axis.

16 Claims, 2 Drawing Sheets

EQUIPMENT ALIGNMENT DOCKING SYSTEM

TECHNICAL FIELD OF THE INVENTION

This invention relates generally to docking systems which permit the accurate mechanical alignment of any two pieces of equipment. The docking system of the present invention is useful where only one of the two pieces of equipment is movable, or in cases where both of the pieces of equipment are movable.

BACKGROUND OF THE INVENTION

In many areas of manufacturing there is a need for the accurate mechanical alignment of two pieces of apparatus or equipment prior to movement of those pieces of equipment into a final superimposed, nested, interlocking or other form of contact with one another. In many cases it may not be possible visually to determine when the two pieces of equipment are in alignment. It is therefore an object of the present invention to provide a docking (alignment) system whereby one can ensure that accurate mechanical alignment of the two pieces of equipment does exist before further movement of one or both pieces of equipment into a final contact position.

SUMMARY OF THE INVENTION

According to the present invention there is provided a docking system comprising male and female docking means, one of which is adapted to be secured to a first item which is to be aligned with a second item, and the other of which is secured to frame means set in a predetermined relationship to said second item, the arrangement being such that the male and female docking means are adapted to mate one with the other when the two items are in alignment and the system permitting subsequent guided movement of the mated docking means to permit further movement, in alignment, of said first item relative to the second item.

In a preferred embodiment of the docking system, the male and female docking means comprise respective docking bars with detents on the male bar engageable in apertures in the female bar and with latching means to maintain the mating relationship of the two bars.

Although the docking system of the present invention can be used where one or both of the items of equipment are movable on any type of equipment transport system, the following description is of a docking system where one piece of equipment is fixed and the other piece of equipment is movable. In either case, there is relative movement between the two pieces of equipment (items).

BRIEF DESCRIPTION OF THE DRAWINGS

In order that the invention may be more fully understood, one presently preferred embodiment of docking system in accordance with the invention will now be described by way of example and with reference to the accompanying drawings, in which.

PREFERRED EMBODIMENT

In the following description, the docking system is described in relation to its use for aligning two pieces of equipment (not shown), one of which is fixed and the other of which is movable and can be raised and moved into alignment on for example an air pallet, i.e. a pallet that can be raised and moved by means of its own set of air bearings. The movable piece of equipment can be movable by means of any type of transport system, such as an hydraulic lifting trolley or a pneumatic lifting device.

The docking system comprises two main parts, namely:
a male docking bar; and
a docking fixture which incorporates a female docking bar.

Figure 1A:
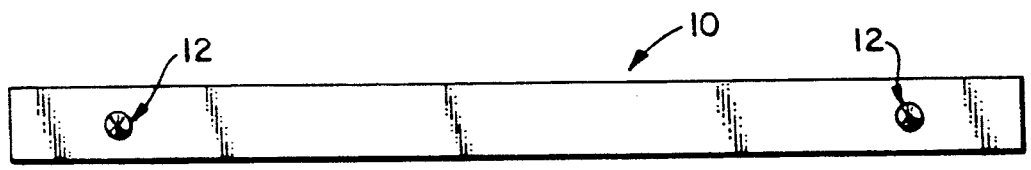
FIGS. 1a and 1b are two orthogonal views of the male docking bar of the docking system of the present invention.
Figure 1B:
Figure 2:
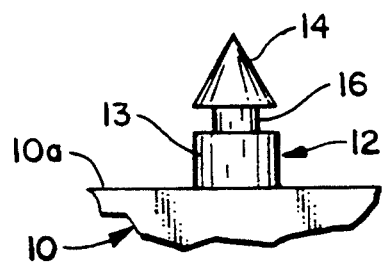
FIG. 2 is an enlarged end-on view of the male docking bar of FIGS. 1a and 1b, showing of one of the docking lugs.

The male docking bar which is indicated generally at 10 in FIGS. 1a and 1b and 2 is affixed to the transportable (movable) item of equipment e.g., the item of equipment which is mounted on the air pallet. The male docking bar 10 is an elongate, rectangular cross-section bar which is provided with two (or more) docking lugs 12.

As shown most clearly in FIG. 2, each docking lug 12 extends outward from a common surface 10a of the docking bar 10. At an end towards the surface of the bar, the lug has a cylindrical portion 13. At an end away from the surface of the bar, the lug has a conical (or 'detent') portion 14, the far end of the conical portion being the apex. Between the base of the conical portion and the far end of the cylindrical portion, the lug is provided with an annular (circumferential) recess (groove) 16. The groove 16 is provided for the purpose of latching the bar 10 to a corresponding docking fixture which is described hereinbelow.

Figure 3:
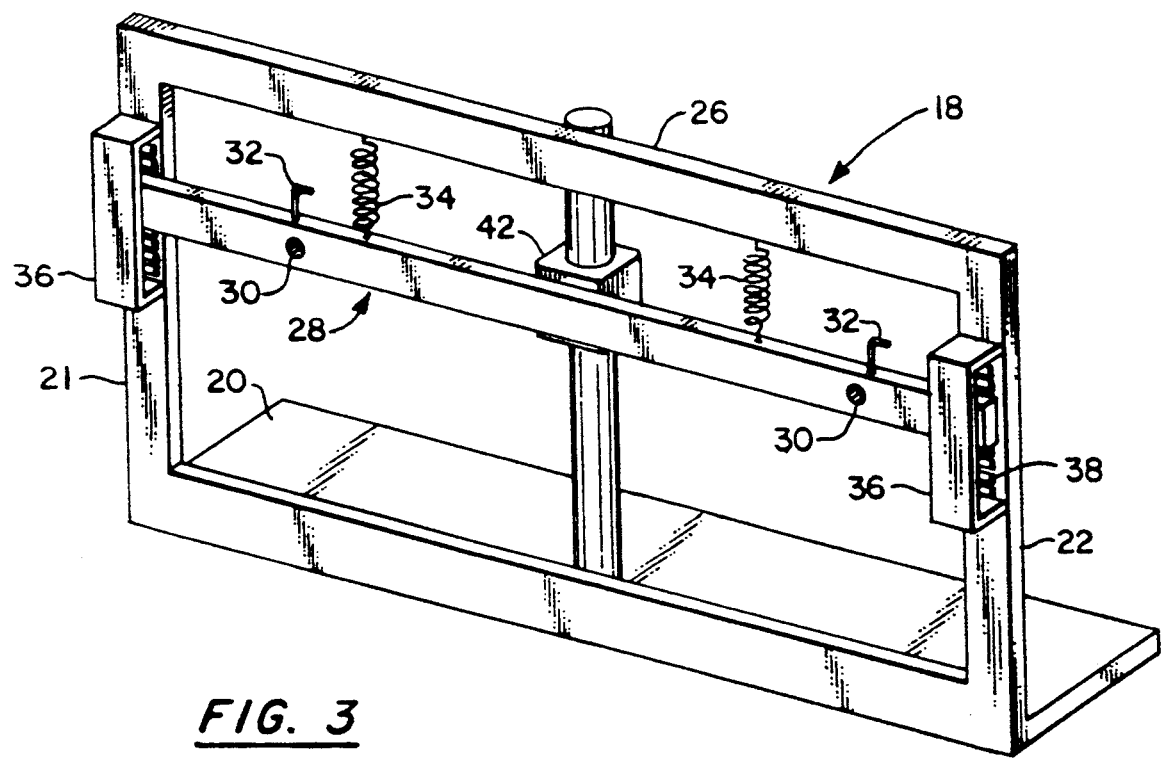
FIG. 3 is a schematic perspective illustration of the docking fixture of the docking system, of the present invention.

The docking fixtures which is indicated generally at 18 in FIG. 3 is designed to be affixed to the ground or some other supporting surface by bolts for example. The docking fixture 18 is positioned in use, in relation to the fixed piece (item) of equipment, so that when the two (i.e., the movable and the fixed) items of equipment to be docked are in alignment then the docking fixture 18 will dock with the male docking bar 10. In other words, the position of the docking fixture 18 is determined in relation to the fixed piece of equipment prior to the docking operation so that when docking has taken place one knows that the two pieces of equipment are then in alignment.

The docking fixture 18 is based on a 90° angle plate. The angle plate includes a base portion 20 and two spaced-apart, upright (as viewed in the figure) portions 21 and 22 at either end of the base portion. An upright portion (central column) 24 extends from the base portion, parallel to and midway between the upright portions 21 and 22. Ends of the uprights 21, 22, away from the base 20, are preferably connected by a cross-piece 26, which cross-piece may also connect the far end of the upright portion 24.

Although the docking fixture is shown as being based on a 90° angle plate, this may be changed in angle and/or position depending upon the surface to which the docking fixture is to be fitted. The docking fixture includes a female docking bar 28 which is held horizontally (as viewed in the figure), being supported at each end by the uprights 21 and 22, and also being supported by the central column 24.

The female docking bar 28 is provided with a pair of tapered holes 30 to receive the docking lugs 12. The taper of the holes 30 preferably matches the taper of the conical section 14 of the lug 12, and may be slightly greater in diameter than the lug at the entrance of the hole 30. The female docking bar 28 is also provided with a locking pin 32 adjacent to each hole 30. Operation of the locking pins 32 causes the male docking bar 10 to be locked solidly in place to the female docking bar 28 after the lugs have entered the holes. The locking pin 32 extends into the hole 30 and fits within the annular groove 16 in the lug, thereby interlocking the male docking bar to the female docking bar.

Two springs 34 are provided between the female docking bar 28 and the cross-piece 26. These provide a resilient suspension for the female docking bar. The female docking bar 28 is mounted on the docking fixture 18 in such a manner that the female docking bar can descend on the central column 24 with the two ends of the bar held by rollers (to the uprights 21 and 22) so that the bar 28 can descend without any back to front movement, i.e. movement into and out of the plane of the drawing as shown in FIG. 3. However, the arrangement is such that the suspension permits up and down movement of the female docking bar 28 at each end. This suspension is achieved as shown most clearly in FIGS. 4 and 5.

Figure 4:
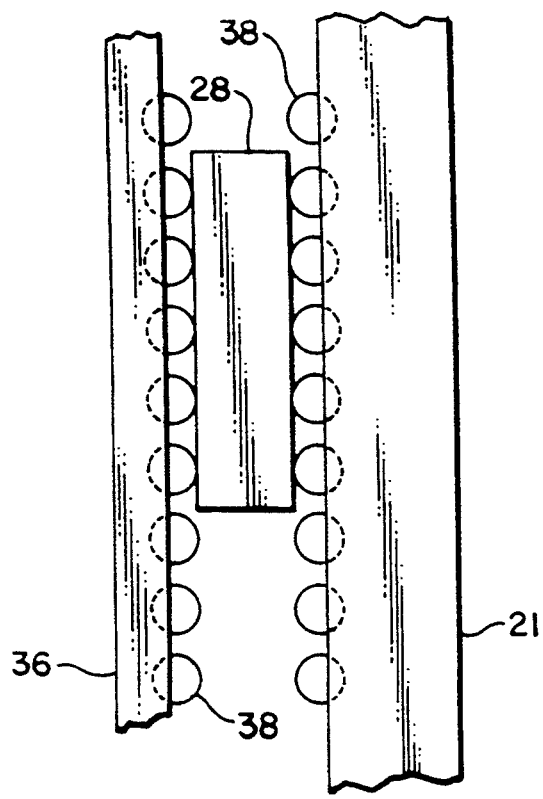
FIG. 4 is a partial view, on an enlarged scale, from one end of the docking fixture of FIG. 3; and, FIG. 5 is a plan view, on an enlarged scale, of the central portion of the female docking bar to illustrate the central mounting of the present invention.

As shown in FIG. 4, each end of the female docking bar 28 is held between the upright 21, 22 and a corresponding bearing cover plate 36 (one plate 36 per upright 21/22), with a linear array of roller bearings 38 provided both on the upright and on the corresponding bearing cover plate to permit up and down movement of the docking bar relative to the fixture. In other words, the ends of the docking bar 28 are permitted a degree of up and down movement by virtue of bearings 38 acting on both major surfaces of the docking bar 28. The range of up/down movement is limited by the extend of the bearings, and is selected in accordance with the particular application to which the present invention is intended to be suited. The bearings 38 evidently maintain the docking bar 28 in good alignment, and prevent front-to-back (left-to-right, as viewed in FIG. 4) movement of the docking bar 28.

Figure 5:
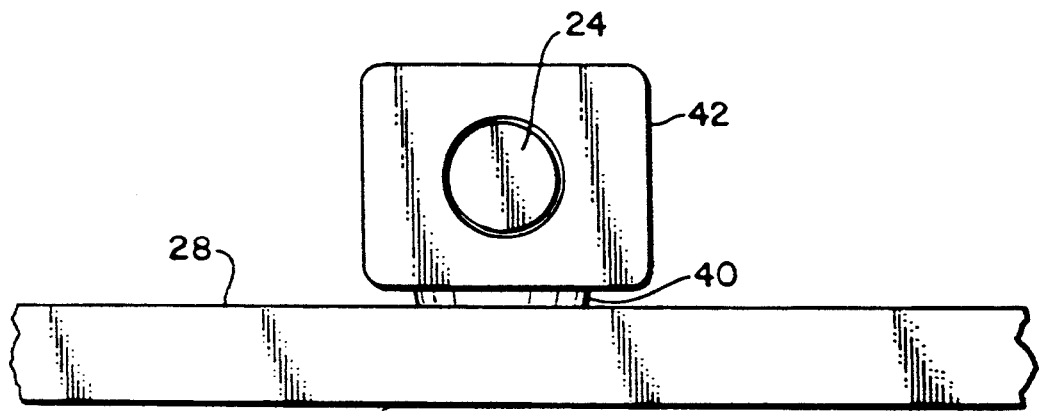

As shown in FIG. 5, the center of the docking bar 28 it is attached to the central column 24 through a ball joint bearing 40 on a sliding block 42 which is mounted on the central column 24. This ball joint allows for a limited degree of non-parallelness of the docking bar with respect to the base 20.

In use, the method of mounting the female docking bar 28 to the docking fixture 18 is such as to allow the male docking bar 10 fitted to the transportable item of equipment to dock to the fixture 18 when the transportable item of equipment is raised up (i.e., to an appropriate level) by means of the air pallet or its equivalent. This is achieved by the use of the two springs 34. Once the male docking bar 10 is locked to the docking fixture 18 and one then knows that the two items of equipment are in correct alignment with each other, then the transportable piece of equipment can be lowered into place by deflating the pneumatic lifting device. The method of mounting the female docking bar 28 on the docking fixture is such that during the descent of the equipment on the lifting device the female docking bar 28, now locked to the male docking bar 10, descends on the central column with the ends of the bar held by the rollers 38 so that it can descend without any yawing movement.

Because of the central mounting through a ball joint bearing 40, one can have a degree of up and down movement of the female docking bar 28 at each end, about the central ball joint 40, in order to allow for any non-linearity (angular movement) in its descent as the air bearings on the pneumatic lifting device deflate. As the pneumatic lifting device deflates so the moveable item of equipment is brought into superimposed, nesting or inter engaging relationship with the fixed piece of equipment, as is desired.

Although the invention has been described above in relation to pieces of equipment one of which is fixed and the other of which is movable, the docking system of the present invention is also applicable to the accurate alignment of two pieces of equipment both of which are movable. With both pieces of equipment being movable it is necessary that one of the pieces of equipment should initially be moved into a predetermined position in relation to the docking fixture, so that then when the docking of the two bars has taken place one knows that the other movable piece of equipment is correctly aligned with the first.

In summary, a piece of movable equipment is provided with a male docking bar (10). An immovable piece of equipment is mounted in relationship to an immovable fixture which has a female docking bar (28). (The male and female docking bars could evidently be interchanged, one for the other.) The female docking bar (28) has freedom to move in one axis (up and down, as viewed in FIG. 3). The movable piece of equipment is brought into contact along another axis (different from and preferably orthogonal to the axis of movement of the female docking bar) to meet the immovable piece of equipment, at which point lugs (12) on the male docking bar mate with corresponding holes (30) on the female docking bar. The male locking bar can then be interlocked (16, 32) to the female docking bar. The movable piece of equipment can then be further moved along the axis of movement of the female docking bar.

What is claimed is:

1. Docking system for docking two pieces of equipment, comprising:

a first docking bar fitted to a first piece of equipment;

a second docking bar fitted to a second piece of equipment and having a degree of freedom to move along a first axis in a first plane;

mating means on said first and second docking bars for mating the first docking bar to the second docking bar;

means for allowing movement of the first piece of equipment in the first axis when the first and second docking bars are mated, and for restraining movement of the second docking bar in a second axis different from said first axis; and support means for supporting the second docking bar; wherein the support means comprises:

two spaced-apart upright elements engaging two ends of the second docking bar, the two spaced-apart upright elements including linear ball bearings allowing movement of the ends of the second docking bar in the first axis, a third upright element disposed between the two spaced-apart upright elements and engaging a central portion of the second docking bar, means joining free ends of the two spaced-apart upright elements and a free end of the third upright element, and means for resiliently urging the second docking bar to an initial position towards the means for joining the free ends of the upright elements.

2. Docking system according to claim 1, further comprising means for allowing angular movement of the second docking bar in the first plane, wherein: the third upright element engages the central portion of the second docking bar via the means for allowing angular movement.

3. Docking system according to claim 1, further comprising:

means for resiliently urging the second docking bar to an initial position in the first axis.

4. Docking system according to claim 3, wherein:

the means for resiliently urging the second docking bar to an initial position in the first axis includes springs.

5. Docking system according to claim 1, further comprising:

a base support from which the two spaced-apart and third upright elements extend.

6. Docking system according to claim 1, wherein the mating means for mating the first docking bar to the second docking bar comprises:

lugs on the first docking bar and corresponding holes on the second docking bar.

7. Docking system according to claim 6, wherein:

the lugs have a cylindrical portion and a conical portion; and the holes are tapered to receive the conical portion.

8. Docking system according to claim 6, further comprising:

means for interlocking the lugs in the holes.

9. Docking system according to claim 8, wherein the means for interlocking comprises:

a groove on the lug and a pin extending into the hole.

10. Docking system for docking two pieces of equipment, comprising:

a first docking bar fitted to a first piece of equipment;

a second docking bar fitted to a second piece of equipment and having a degree of freedom to move along a first axis in a first plane;

mating means on said first and second docking bars for mating the first docking bar to the second docking bar;

means for allowing movement of the first piece of equipment in the first axis when the first and second docking bars are mated, and for restraining movement of the second docking bar in a second axis different from said first axis; and support means for supporting the second docking bar; wherein the support means comprises:

two spaced-apart upright elements engaging two ends of the second docking bar;

wherein the support means further comprises:

a third upright element, disposed between the two spaced-apart upright elements and engaging a central portion of the second docking bar, a ball joint bearing for allowing angular movement of the second docking bar in the first plane; and wherein:

the third upright element engages the central portion of the second docking bar via the ball joint bearing.

11. Docking system according to claim 10, further comprising: means for resiliently urging the second docking bar to an initial position in the first axis.

12. Docking system according to claim 11, wherein: the means for resiliently urging the second docking bar to an initial position in the first axis includes springs.

13. Docking system according to claim 10, further comprising: mans joining free ends of the two spaced-apart upright elements and a free end of the third upright element.

14. Docking system according to claim 13, further comprising: means of resiliently urging the second docking bar to an initial position towards the means for joining the free ends of the upright elements.

15. Docking system according to claim 10, further comprising: a base support from which the two spaced-apart and third upright elements extend.

16. Docking system according to claim 10, wherein the mating means for mating the first docking bar to the second docking bar comprises:

lugs on the first docking bar and corresponding holes on the second docking bar.

* * * * *